Dec. 22, 1964
W. D. SCHAEFFER ETAL
3,162,693
CLATHRATION METHOD
Filed July 31, 1961
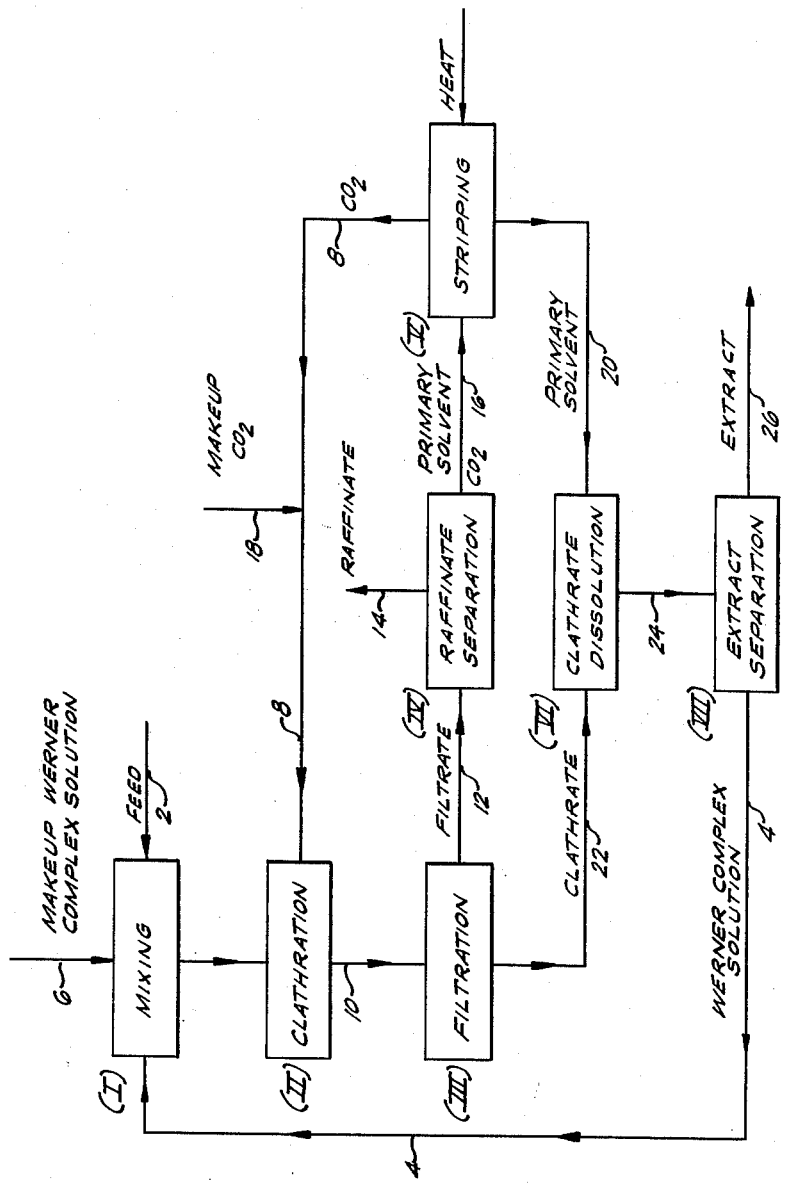
INVENTORS
WILLIAM D. SCHAEFFER
HOMER E. REA JR.
BY
*John H. Crowe*
AGENT 3,162,693
CLATHRATION METHOD
William D. Schaeffer, Pomona, and Homer E. Rea, Jr., Fullerton, Calif., assignors to Union Oil Company of California, Los Angeles, Calif., a corporation of California
Filed July 31, 1961, Ser. No. 128,029
20 Claims. (Cl. 260—674)

This invention relates to a method for separating difficultly separable compounds such as isomers or the like by selective clathration with Werner complexes in alkaline solvent media. In greater particularity, the method relates to the use of carbon dioxide as a precipitating agent for clathrates formed between certain of the difficultly separable feed mixture components and Werner complexes, whereby recovery of the clathrates and release of the clathrated feed mixture components in relatively concentrated form can be readily accomplished.

The general concept of separating difficultly separable compounds by clathration techniques employing Werner complexes is not new. In this connection, attention is directed to U.S. Patent No. 2,798,891 which sets forth the basic discovery involved here, namely, that certain organic Werner complexes are capable of selectively occluding, either during or after formation of their crystalline structures, certain organic compounds, while other organic compounds of similar chemical and physical properties are occluded to a much smaller extent, or not at all. The specific explanation for this phenomenon is not known with certainty, but present information indicates that it can be explained on the basis of clathrate formation between the occluded material and the Werner complex. In any event, the use of Werner complexes of the type mentioned for the separation of mixtures of organic compounds by selective occlusion of certain components will, for simplicity's sake, and in accordance with customary practice among chemists, be herein considered and identified in clathration terms.

One technique for carrying out clathration operations with Werner complexes, such as those described in U.S. 2,798,891, adverted to above, is to contact the feed mixture to be separated with a solution of the Werner complex in a primary solvent consisting of an aqueous solution of a relatively strong nitrogen base such as ammonia, an alkanolamine, or the like. Under ideal circumstances, this technique operates as follows: (1) the feed mixture and Werner complex are subjected to intimate contact in an aqueous liquid medium which is then environmentally altered in such fashion as to cause solid clathrate (of Werner complex and a selected fraction of the feed) to precipitate out; (2) the solid clathrate is physically removed from the system and the remaining liquid is then separated into a raffinate phase and an aqueous phase; and (3) the solid clathrate is redissolved in the aqueous phase from step (2), to release the clathrated feed material as an extract product, by a reversal of the environmental alteration procedure of step (1).

In past attempts to carry out the above-noted clathration technique, difficulties have been experienced in efforts to arrive at a sinmple and practical means of effecting the kind of reversible environmental alteration thereby required. The present invention provides such a means through utilization of the relatively inexpensive and readily available carbon dioxide in a manner as hereinafter described.

Briefly, this invention entails the addition of carbon dioxide to the mixture of feed material and Werner complex solution of step (1), supra, to bring about precipitation of the clathrate, and the reverse procedure of removing the carbon dioxide from the system to regenerate the primary solvent and thus promote solution of the solid clathrate in accordance with step (3), supra.

It is thus a principal object of this invention to provide a practical clathration method for separating difficultly separable compounds by means of a simple and inexpensive environmental alteration technique whereby clathrates can be easily precipitated from and redissolved in clathration media to permit separation and recovery of raffinate and extract products from the system at will.

Other objects and advantages of the invention will be apparent from the complete description thereof which follows.

One of the preferred Werner complexes for use in clathration processes of the instant type is nickel tetra (4 - methylpyridine)dithiocyanate. This material has been disclosed in U.S. Patent 2,798,891, as a particularly effective Werner complex for clathration purposes. Hereinafter, in the interest of greater brevity, 4-methylpyridine will be abbreviated as 4MP, and nickel tetra (4-methylpyridine)dithiocyanate will be symbolically referred to as $Ni(4MP)_4(SCN)_2$. Also, the basic Werner complex substituent, as exemplified by the aforesaid 4MP, will be generically referred to as the Werner amine, and the remaining portion of the Werner complex, such as the $Ni(SCN)_2$ in $Ni(4MP)_4(SCN)_2$, will be referred to as the Werner salt.

As previously indicated, in the improved clathration method of this invention the Werner complex is employed in the form of a solution in a primary solvent. The primary solvents suitable for such utility are aqueous alkaline solutions such as aqueous solutions of ammonia, an alkanolamine, piperidine, or the like, which may or may not contain a buffer salt such as an ammonium salt.

The present invention will be more completely understood by reference to the accompanying drawing which schematically illustrates one technique for the practice of our new clathration method. Turning now to the drawing, feed to be resolved is introduced through line 2 and recycle Werner complex solution is introduced through line 4, from a source hereinafter disclosed, to mixing step (I). Makeup Werner complex solution is fed to step (I) through line 6 as needed.

The step (II) clathration is effected by introducing carbon dioxide into the mixed material from step (I), through line 8, from a source hereinafter identified. The presence of the carbon dioxide causes the precipitation of solid clathrate comprising the Werner complex and the more readily clathrated portion of the feed mixture. The less readily clathrated part of the feed remains in liquid form in the mixture. It is not to be inferred that mixing step (I) and clathration step (II) are always carried out as separate and distinct operations. Thus, it is within the scope of our invention to bring together the Werner complex solution, feed, and $CO_2$ simultaneously under such conditions as to accomplish the mixing and clathration concurrently, or substantially so.

As will be emphasized presently in the detailed discussion of the alkali solutions suitable for use as primary solvents in the method of this invention, the alkali constituent of the solution must be a nitrogen base of sufficient strength to form a bicarbonate upon contact with carbon dioxide in the presence of water. Consequently, a simplified explanation of why solid clathrate precipitates in step (II) is that the carbon dioxide by its reaction with the alkali in the primary solvent neutralizes that ingredient and thus converts the solvent into a substantially neutral aqueous solution, of no more effectiveness than water (in which the Werner complexes of this invention are known to be insoluble) as a primary solvent. This being so, it is obvious that the clathrated Werner complex will precipitate from the surrounding primary solvent medium (in which it is soluble) when that medium is rendered impotent as such by the addition of carbon dioxide.

While it is felt that little purpose would be achieved by a lengthy theoretical discussion of the chemistry involved in clathration step (II), it will perhaps lead to a better understanding of the invention to briefly touch upon that subject here. Although, as indicated, the subject Werner complexes are insoluble in water, they are soluble in alkaline primary solvents because the relatively strong nitrogen base present in such solutions competes with the relatively weak Werner amine for the nickel, or equivalent metal, from the Werner salt and forms a water soluble coordination complex therewith. It is easy to see how this type of chemical interreaction among the components of Werner complex-primary solvent solutions precludes the formation of solid material in the system and accounts for the solvent properties of the primary solvent toward the Werner complex. The addition of carbon dioxide to the system changes all of this. By its bicarbonate reaction with the nitrogen base in the primary solvent, carbon dioxide ties up its unshared nitrogen electrons and this prevents coordination between the solvent base and the Werner salt metal, the net result being substantially unhindered formation of the Werner complex which, being insoluble in water, precipitates from the mixture as a solid. If there is a clathratable material present, it forms a clathrate with the Werner complex and is thus carried out of the solution as a part of the precipitated solid. It is, of course, to be understood that the above theoretical considerations have no limitative effect of any sort on the scope of our invention and are presented only as an aid to a fuller understanding of our process.

As will be apparent from the above discussion, best results are obtainable in our process when the $CO_2$ is added to the feed-Werner complex mixture in quantities stoichiometrically equivalent to the amount of primary solvent base present (optimum proportions in most cases are from about 1 to about 2 mols $CO_2$/mol base). Excesses of $CO_2$ above the optimum range do not render the process inoperable but are impracticable in many cases.

The slurry from clathration step (II) is transferred via line 10 to filtration step (III) for purposes of separating the liquid from the solid phase. Other means of separating solids from liquids such as, for example, settling or centrifuging procedures, may be used in place of the filtration, if desired.

The liquid filtrate from step (III) is transferred via line 12 to raffinate separation step (IV) where the non-clathrated portion of the feed is allowed to stratify and separate. Such stratification is a normal feature of our process since the feed mixtures are of an organic nature and usually consist of hydrocarbons insoluble in water or aqueous solutions. The liquid phases from step (IV) are a raffinate phase of non-clathrated feed material and an aqueous phase consisting of primary solvent and carbon dioxide, the latter being present as the bicarbonate of the primary solvent base. Such bicarbonates, as those skilled in the art realize, are water soluble.

The raffinate phase from step (IV) is withdrawn to storage or other disposition via line 14. The aqueous primary solvent phase from step (IV) is transferred via line 16 to stripping step (V). In stripping step (V), carbon dioxide is stripped from the primary solvent phase by heating the mixture, with reflux if desired, until $CO_2$ evolution substantially ceases. The $CO_2$ from step (V) is recycled to clathration step (II) through line 8. Makeup $CO_2$, to compensate for losses, is fed into the system through line 18 as needed.

There is normally dissolved in the raffinate phase of the filtrate from filtration step (III) a small amount of Werner amine. In order to recover this Werner amine for reuse in the system, various recovery techniques have been integrated with or incorporated into raffinate separation step (IV). It is within the scope of this invention to employ such techniques, one being the use of an organic secondary solvent which dissolves the non-clathrated feed material and Werner amine from the filtrate. Another, and more preferable technique, is to employ a secondary solvent in conjunction with an organic acid in such fashion as to effect a recovery of the Werner amine. Methods of so using these materials will be discussed in greater detail hereinafter.

The stripped primary solvent from step (V) is transferred via line 20 to clathrate dissolution step (VI) to which the solid clathrate from filtration step (III) is also transferred, as shown at 22 on the drawing. In clathrate dissolution step (VI), the solid clathrate is redissolved in the primary solvent from step (V), which now has no $CO_2$ present to tie up the nitrogen base and thus hinder its functioning in normal fashion as a primary solvent.

Upon dissolution of the clathrate, the previously clathrated feed material normally forms a separate liquid phase. The resulting two-phase mixture is then transferred via line 24 to extract separation step (VII), where the formerly clathrated feed material is separated by settling and decantation or any other suitable method. Here again, as in the case of raffinate separation step (IV), additional means such as those employing an organic secondary solvent, either alone or in conjunction with an organic acid, may be used in supplemental relationship to, or as a part of, step (VII) for purposes of recovering Werner amine dissolved in the formerly clathrated feed material.

Extract separation step (VII) normally yields two liquid products, i.e., an extract phase consisting essentially of the formerly clathrated feed material and an aqueous phase consisting essentially of reconstituted Werner complex solution. The extract phase is removed via line 26 as one product of the process (the other product being the raffinate removed via line 14) and the reconstituted Werner complex solution is recycled to mixing step (I) through line 4.

The Werner complexes of this invention are made up of at least three components. The fundamental unit is a Werner salt comprising two of the components, i.e., a metal and an accompanying anion. The first major component is a metal having an atomic number above 12 which is capable of forming cordinate complexes of the Werner type. We have observed that divalent metals having incompletely filled $3d$ or $4d$ electron shells are particularly amenable to Werner complex formation. Examples of some metals fitting this description are manganese, iron, cobalt, nickel, palladium and platinum, of which the first four are preferred because of their good performance characteristics, relatively low cost and ready availability.

The anion of the Werner salt, the second major component of Werner complexes, may comprise any suitable negative radical, e.g., thiocyanate, isothiocyanate, azide, cyanate, isocyanate, cyanide, sulfate, nitrate, nitrite, chloride, bromide, iodide, phosphate, formate, acetate, and the like. A group of negative radicals found to be particularly effective for the present purposes consists of the monovalent anions, particularly the thiocyanate, isothiocyanate, azide, cyanate, isocyanate and cyanide radicals. However, any anion may be utilized, the salts of which are capable of producing crystalline Werner complexes by coordinate bonding to the Werner amines hereinafter described. Such complexes are described generally in Modern Aspects of Inorganic Chemistry, Emeleus and Anderson, 79–189, Van Nostrand Co. (1946), and also in Textbook of Inorganic Chemistry, vol. X, M. M. J. Sutherland, J. P. Lippincott Co. (1928).

The third major component of the Werner complexes consists of one or more of the Werner amines. Werner amines, as that term is employed herein, are normally heterocyclic nitrogen bases which are bound to the central metal atom of the Werner complex through coordinate bonds. The operative complexes are mainly of the tetra- and hexa-coordinate types, wherein the metal atom is coordinated with four or six atoms of basic nitrogen. The nitrogen base should be selected so as to give a maximum selective absorption for the particular compound which is to be absorbed into the crystal lattice of the complex. For example, if it is desired to absorb p-xylene, a very suitable nitrogen base is 4-methylpyridine. Not all nitrogen bases are equally effective in forming complexes which will absorb the desired component. For example, the 3-methylpyridine complex with nickel thiocyanate is not as effective as the 4-methylpyridine complex for absorbing p-xylene, presumably because of the steric effect of the 3-methyl group. However, the 3-methylpyridine complex may be used advantageously for absorbing other compounds. The nitrogen bases should therefore be selected by a judicious combination of theoretical reasoning and actual testing of the complexes with the particular mixture to be separated. The overall molecular dimensions of the nitrogen base should preferably approximate the over-all molecular size of the compound to be absorbed in the complex.

In general, any heterocyclic nitrogen base may be employed which is sufficiently basic to form coordinate complexes with the above-described salts. This includes monocyclic and polycyclic compounds, wherein at least one of the heterocycles contains from one to three hetero-N atoms. In over-all size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, substituted pyrroles, substituted piperidines, and the like.

A particularly preferred class of organic bases are the heterocyclic, resonance-stabilized bases which contain one to three, but preferably one, hetero-N atoms. Suitable examples are pyridine, the picolines, pteridine, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds are sufficiently strong bases to form relatively stable Werner complexes, and the resulting complexes are capable of selectively forming clathrates stable at room temperatures with a wide variety of aromatic compounds. Suitable substituted pyridines comprise the following:

4-methylpyridine
4-ethylpyridine
4-n-propylpyridine
4-isopropylpyridine
4-n-butylpyridine
4-n-hexylpyridine
4-vinylpyridine
4-fluoropyridine
4-chloropyridine
4-bromopyridine
4-hydroxypyridine
4-hydroxymethylpyridine
4-methoxypyridine
4-aminopyridine
methylisonicotinate
4-cyanopyridine
4-acetylpyridine
4-chloromethylpyridine
3-methylpyridine
3-ethylpyridine 3-n-propylpyridine
3-isopropylpyridine
3-n-butylpyridine
3-vinylpyridine
3-chloropyridine
3-hydroxypyridine
3-methoxypyridine
3-acetylpyridine
3-cyanopyridine
ethyl nicotinate
3,4-dimethylpyridine
3,4-diethylpyridine
3-methyl, 4-ethylpyridine
4-methyl, 3-ethylpyridine
4-methyl, 3-n-hexylpyridine
4-methyl, 3-cyanopyridine
4-chloro, 3-methylpyridine
4-acetyl, 3-methylpyridine
4-methoxy, 3-ethylpyridine
isoquinoline While, as indicated above, the Werner amines suitable for use in the preparation of Werner complexes within the scope of this invention are normally heterocyclic nitrogen bases, it is not essential that this be the case and other nitrogen bases known to form Werner complexes suitable for purposes of our invention can be used in lieu of said heterocyclic bases if desired. Particularly exemplary of nitrogen bases, other than heterocyclic bases, suitable for such purposes, are the substituted primary benzylamines having one or the other of the following general formulas:

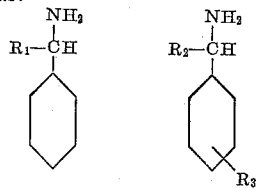

wherein $R_1$ is a primary alkyl group, $R_2$ is H or a primary alkyl group and $R_3$ is a neutral, relatively non-coordinating functional group such as alkyl, halogen, hydroxyl, nitro, alkoxy, aryloxy, cyano, carboalkoxy, alkanoyl, acetyl, etc., which is compatible with any functional groups present in the mixture of compounds to be separated by the particular Werner complex under consideration; $R_3$ may be either polar or not and it can be located on the ortho, meta or para position of the benzene ring.

Some typical compounds fitting the above description are:

α-Methylbenzylamine
α-Ethylbenzylamine
α-Propylbenzylamine
α-Butylbenzylamine
α-Isobutylbenzylamine
α-Amylbenzylamine
α-Hexylbenzylamine
α-Octylbenzylamine
α-Methyl-p-methylbenzylamine
α-Methyl-o-methylbenzylamine
α-Methyl-p-ethylbenzylamine
α-Methyl-p-isopropylbenzylamine
α-Methyl-p-t-butylbenzylamine
α-Methyl-p-methoxybenzylamine
α-Methyl-p-fluorobenzylamine
α-Methyl-p-chlorobenzylamine
α-Methyl-o-chlorobenzylamine
α-Methyl-p-bromobenzylamine
α-Methyl-p-iodobenzylamine
α-Methyl-n-nitrobenzylamine
α-Propyl-p-methylbenzylamine
α-Propyl-p-bromobenzylamine
α-Isobutyl-p-bromobenzylamine
α-Methyl-p-cyclohexylbenzylamine
p-Methylbenzylamine
p-Bromobenzylamine
p-Dimethylaminobenzylamine Many other similar examples of suitable Werner amines could be cited, as will be apparent to those skilled in the art, and the complexes may include only one such amine, or a mixture of two or more may be employed, in which case a mixed complex is formed.

The preferred Werner complexes of monovalent anion salts of this invention may be designated by the following general formula:

$$A_nX \cdot Z_y$$

wherein X is the metal atom as above defined, Z is the Werner amine, A is the anion as above defined, y is a number from 2 to 6, and n is a number from 1 to 3.

Examples of suitable complexes which may be employed are as follows:

$Ni(4MP)_4(SCN)_2$
$Cu(4MP)_4(SCN)_2$
$Hg(4MP)_4(NHN)_2$

Ni(1-hexylamine)$_6$(SCN)$_2$
Co(pyridine)$_4$(OCN)$_2$
Cd(4MP)$_4$(CN)$_2$
Ag(4MP)$_2$(NNN)
Cr(pyridine)$_4$SO$_4$
Ti(isoquinoline)$_3$(NH$_3$)$_3$(C$_2$O$_4$)$_2$
Ni(4MP)$_4$Cl$_2$
Ni(4MP)$_4$(N$_3$)$_2$
Ni(4-n-propylpyridine)$_4$(SCN)$_2$
Ni(isoquinoline)$_4$Cl$_2$
Ni(4MP)$_4$Br$_2$
Mn(4MP)$_4$(SCN)$_2$
Mn(isoquinoline)$_4$(SCN)$_2$
Zn(4MP)$_4$Cl$_2$ Obviously many other complexes similar to the above could be employed, not all of which would give optimum separation of all mixtures but which should be selected to meet the specific peculiarities of the mixture concerned.

The primary solvents employed herein contain water plus any organic or inorganic nitrogen base of sufficient strength to form a bicarbonate upon contact with carbon dioxide in the presence of water. The ratio of nitrogen base to water will vary widely depending upon the Werner complex used and the particular nitrogen base. Generally, the primary solvent will contain between about 10 and about 90 percent by weight of nitrogen base. The ratio should, of course be such as to provide the desired solubility of the Werner complex under the service conditions contemplated. When using ammonia, suitable concentrations may range between about 10 and about 30 percent by weight. Monoethanolamine is a preferred nitrogen base for present purposes. Operative primary solvent concentration for monoethanolamine may range between about 10 and about 70 percent by weight. In all cases, it is preferred to use sufficient water to render the feed mixture substantially insoluble in the primary solvent.

Other alkanolamines which may be used in place of monoethanolamine include for example, diethanolamine; triethanolamine; 2-amino-n-butanol; 2-amino-2-methyl-1-propanol; 2-(methylamino)ethanol; 2-(ethylamino)ethanol; 2 - amino-2-ethyl-1,3-propanediol; 2-amino-2-methyl-1,3-propanediol; and the like. In general any lower alkanolamine containing from about two to about ten carbon atoms, from one to three amino groups, and from one to three hydroxyl groups may be employed, including primary, secondary, and tertiary amines. The operative ratios of alkanolamine in the primary solvent may vary widely, e.g., from about 2 percent to 75 percent by weight. Preferred ratios generally fall within the range from about 10 percent to about 70 percent. The greater the concentration of alkanolamine in the solvent, the greater will be the solubility of Werner complex and feed mixture therein.

Other suitable primary solvent bases are methylamine, dimethylamine, trimethylamine, methyl-ethylamine, ethylamine, diethylamine, triethylamine, n-propylamine, isopropylamine, n-butylamine, isobutylamine, isoamylamine, piperidine, and the like.

While, as indicated, volatile bases such as ammonia, methylamine, etc., can be used in primary solvents within the scope of this invention, it is preferable to employ less volatile bases, such as the alkanolamines, for this purpose. The reason for this is the obvious difficulty which the presence of a base of relatively high volatility in the primary solvent presents, particularly during the CO$_2$ evolution treatment. Although it is possible to conduct the CO$_2$ removal operation in such fashion as to substantially prevent volatile base loss (by suitable temperature and pressure control), it is far preferable to employ a base of relatively low volatility and thus avoid the base loss problem entirely. In addition to preferring amines of lower volatility as primary solvent bases, we normally prefer amines containing at least one nonamino functional group (such as, for example, the hydroxy containing alkanolamines) of a type conducive to lower amine solubility in typical extract and raffinate products of this invention.

Where bases of relatively low volatility are employed, the CO$_2$ can be separated from the primary solvent in the stripping step by simply heating the primary solvent-CO$_2$ mixture at atmospheric pressure. Normally, temperatures of from about 90° to about 120° C. are suitable for this purpose It is, of course, essential in all cases to conduct the CO$_2$ stripping operation at a temperature level sufficient to substantially remove CO$_2$ but low enough so that there will be little or no loss of any other ingredient from the solution.

Where aqueous alkanolamine solutions are employed as primary solvents in our process, it is usually desirable to adjust the alkanolamine and Werner complex concentrations so as to assure little or no precipitation of Werner complex or clathrate (in the absence of CO$_2$) at any temperature to which our system will be exposed therein. While it is true, as those skilled in the art appreciate, that the greater the concentrations of alkanolamine and the lower the concentration of Werner complex for a given primary solvent formulation, the lower will be the crystallization temperature, no serious crystallization problem is encountered at normal operating temperatures incident to our process. Any excess alkanolamine which must be employed (usually at lower operating temperatures) to prevent undue crystallization of Werner complex or clathrate suffers little or no loss to the system since it is continuously recycled for reuse in the manner described above. Furthermore, it is within the scope of our invention to operate under such conditions that part of the clathrate precipitation (but not all) is influenced by temperature, the remainder, of course, occurring as a result of the CO$_2$ addition of this invention.

The class of ammonium salts suitable as buffer salts in primary solvents includes substituted, as well as unsubstituted, ammonium salts. Suitable ammonium salts are ammonium thiocyanate, ammonium chloride, ammonium sulfate, ammonium nitrate, ammonium acetate, ammonium citrate, ammonium oxalate, ammonium glycolate, ammonium succinate, and the like. Suitable substituted ammonium salts include methyl ammonium thiocyanate, dimethyl ammonium thiocyanate, ethyl ammonium chloride, ethyl ammonium sulfate, ethanolammonium thiocyanate, ethanolammonium chloride, ethanolammonium sulfate, ethanolammonium cyanate, ethanolammonium cyanide diethanolammonium thiocyanate, ethanolammonium acetate, and the like. These salts may be used in proportions ranging between about 1% and 40% by weight of the primary solvent, depending upon relative solubilities. Any amounts are effective in some degree, and the preferred proportions generally range between about 15% and 30% by weight.

The preferred ammonium buffer salts are those having an anion equivalent to that of the Werner salt in the system. The preferred Werner salts are thiocyanates and therefore ammonium thiocyanates are favored as buffer salts. It is desirable, if possible, to use an ammonium salt of the same nitrogen base as that in the primary solvent. To illustrate, where ethanolamine is employed in the primary solvent, the preferred buffer salt is ethanolammonium thiocyanate.

There are a number of ways of preparing Werner complex solutions suitable for purposes of this invention. Where the solution includes no buffer salt, it can be prepared by simply dissolving an appropriate Werner complex, such as, for example Ni(4MP)$_4$(SCN)$_2$, in suitable proportion, in a primary solvent such as an aqueous ammonia or alkanolamine solution. Where a buffer salt is included in the formulation, the solution can be prepared in the above-described manner but with the additional steps of dissolving a situation proportion of a buffer salt, e.g., ethanolammonium thiocyanate, in the mixture. The ammonium buffer salts useful in this invention are either readily available or easily prepared by methods well known to chemists. For example, ethanolammonium thiocyanate is conveniently prepared by simply boiling an aqueous solution of ammonium thiocyanate and ethanolamine, whereby ammonia is volatilized from the mixture to leave behind an aqeous solution of ethanolammonium thiocyanate. If it is desired to recover ethanolammonium thiocyanate from the solution, the water is merely evaporated therefrom.

A preferred way of preparing Werner complex solutions in primary solvents containing buffer salts comprises mixing an aqueous solution of an appropriate ammonium salt, such as ammonium thiocyanate, with a stoichiometric excess of a suitable primary solvent base, such as ethanolamine; adding less than a stoichiometric quantity of a suitable metal carbonate or hydroxide, such as nickel carbonate or hydroxide, to the resulting solution; and adding a quantity of a suitable Werner amine, such as 4MP, to the solution. For a more detailed description of this method see copending U.S. patent application Serial No. 103,625, filed April 17, 1961.

The preferred ingredient proportions for primary solvents containing buffer salts in solution will vary depending upon the particular ingredient combinations involved. Where the primary solvent consists of water, an alkanolamine, and an alkanolammonium thiocyanate, it has been determined that preferred (although not critical) proportions are those from about 30 to about 60 percent water, from about 30 to 50 percent alkanolamine, and from about 10 to about 30 percent alkanolammonium thiocyanate. A preferred Werner complex solution for clathration purposes consists of a 25 percent solution of $Ni(4MP)_4(SCN)_2$ in a primary solvent of the following composition:

| Component: | Weight percent |
|---|---|
| Water | 45 |
| Ethanolamine | 38 |
| Ethanolammonium thiocyanate | 17 |
| | 100 |

As in the case of the primary solvent ingredient proportions, the preferred concentrations of Werner complexes in Werner complex solutions will vary, depending upon the particular complex and primary solvent ingredients involved. Where the preferred Werner complex, $Ni(4MP)_4(SCN)_2$, is employed in a primary solvent containing water, ethanolamine and ethanolammonium thiocyanate as ingredients, best results are generally achieved with Werner complex concentrations of from about 15 to about 40 percent by weight. Incidentally, all concentrations set forth herein, unless otherwise specified, are on a weight basis.

The amount of complex to be employed, relative to the feed mixture, depends upon its specific capacity for absorbing the particular feed component concerned, and also upon the proportion of that component present in the original mixture, as well as upon the temperature of clathration. The complexes are found in general to be capable of absorbing between about 5% to 70% by weight of absorbable compounds. Optimum efficiency may require that more or less than this "stoichiometric" amount of complex be employed, depending upon its relative capacity for other components in the mixture to be resolved. In general, the amount of complex to be employed may vary between about 0.25° and 20 parts by weight per part of the feed component to be clathrated. Smaller proportions of complex will generally yield a purer extract, while the larger proportions result in more complete recovery of absorbable components from the feed mixture.

As previously indicated, the term "clathrating" as used herein is intended to mean any adsorption or absorption by the herein described Werner complexes of a sorbable organic compound, regardless of the manner in which such sorption takes place. The term "extract" refers to the feed material which is absorbed into the clathrate, thus excluding the nitrogen bases, which are bound by coordinate valences. The term "aromatic" is intended to include all resonance-stabilized, cyclic, unsaturated compounds, which exhibit predominantly substitution rather than addition reactions toward electrophilic reagents. (cf. Remick A.E., Electronic Interpretations of Organic Chemistry, John Wiley, New York (1943).

A wide variety of feed mixtures can be resolved by the clathration method described above. Said method is operative for separating substantially any mixture of organic compounds wherein the components differ in molecular configuration, and wherein at least one component is substantially aromatic in character. By "substantially aromatic" is meant that at least about 20 percent of the carbon atoms in the molecules to be clathrated are present as structural units of an aromatic ring, the term "aromatic" having the meaning specified above. Any remaining carbon atoms may be present as saturated or unsaturated aliphatic side chains, or saturated or unsaturated non-aromatic ring systems. Such compounds may contain a total of from 4 to 60, and preferably from 6 to 20, carbon atoms.

A difference in "molecular configuration," as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character of the Werner complex. Generally excluded are those compounds which are either so acidic as to decompose the Werner complex, or so basic as to displace the Werner amine from the werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the feed components are as follows: —F, —Cl, —Br, —I, —$NO_2$, aryl-$NH_2$, —OR, alkyl-OH, aralkyl-OH, —CO, —CHO, —CN, —COOR, —COR, —OOO-metal, —SR, —$CONH_2$, wherein R is a hydrocarbon radical. Many groups which are generally, though not always, disruptive and to be avoided are —SH, aryl-OH, —COOH, alkyl-$NH_2$, aralkyl-$NH_2$, and the like, unless they are first converted to more nearly neutral derivatives.

Feed mixtures which lend themselves particularly well to separation by the clathration procedure described above are xylene mixtures such as those containing as typical ingredients p-xylene, m-xylene, o-xylene and ethylbenzene. My preferred Werner complex solution previously identified as a 25 percent solution of $Ni(4MP)_4(SCN)_2$ in a primary solvent of water, ethanolamine and ethanolammonium thiocyanate in specified proportions has been found to be of great usefulness for the separation of these xylene mixtures. Other mixtures which are separable by the subject clathration procedures include the following, but these examples are by no means exhaustive.

(A) Hydrocarbon mixtures:

o-Ethyl toluene
p-Ethyl toluene o-Ethyl toluene
m-Ethyl toluene p-Ethyl toluene
m-Ethyl toluene Mesitylene
Pseudocumene Cumene
Mesitylene Cumene
Pseudocumene p-Cymene
p-Diethylbenzene m-Cymene
Mesitylene Prehnitene
Durene Durene
Isodurene Prehnitene
Isodurene Cyclohexane
Benzene Methyl-cyclohexane
Toluene Benzene
n-Heptane Benzene
2,3-dimethyl pentane Methyl cyclopentane
Benzene Picene
Chrysene Picene
1,2,5,6-dibenzanthracene Tetralin
Naphthalene Tetralin
Decalin Diphenyl
Diphenyl methane Anthracene
Phenanthrene 1-methyl anthracene
1-methyl phenanthrene Naphthalene
Diphenyl 1-methyl anthracene
2-methyl anthracene 1-methyl naphthalene
2-methyl naphthalene 1-ethyl naphthalene
2-ethyl naphthalene p-Di-n-propyl benzene
Hexamethyl benzene o-Cymene
p-Cymene p-Cymene
n-Cymene m-Cymene
p-Cymene p-Methyl styrene
m-Methyl styrene p-Methyl styrene
o-Methyl styrene Cyclohexane
Methyl cyclopentane (B) Hydrocarbon-non-hydrocarbon mixtures:

2,5-dimethyl furan
Benzene

Anthraquinone
Anthracene

Benzene
Thiophene 2-methyl thiophene
Toluene o-Xylene
Thiophene

Naphthoquinone
Naphthalene (C) Non-hydrocarbon mixtures:

o-Methyl toluate
p-Methyl toluate o-Methyl toluate
m-Methyl toluate p-Methyl toluate
m-Methyl toluate 1-nitro naphthalene
2-nitro naphthalene 1-amino naphthalene
2-amino naphthalene Aniline
Nitrobenzene o-Toluidine
p-Toluidine o-Nitrotoluene
p-Nitrotoluene o-Dichlorobenzene
p-Dichlorobenzene o-Chlorotoluene
p-Chlorotoluene o-Methyl anisole
p-Methyl anisole Coumarin
Vanillin Furan
Thiophene Sodium p-cresylate
Sodium m-cresylate Potassium terephthalate
Potassium isophthalate Dimethyl isophthalate
Dimethyl terephthalate Dimethyl isophthalate
Dimethyl orthophthalate Sodium o-toluene sulfonate
Sodium p-toluene sulfonate Sodium-1-methyl-3-naphthalene sulfonate
Sodium-1-methyl-4-naphthalene sulfonate Estriol
Estrone Estriol
Estradiol Picolinic acid
Nicotinic acid Thymol
Menthol 2-naphthol-6-sodium sulfonate
2-naphthol-8-sodium sulfonate p-Amino benzaldehyde
o-Amino benzaldehyde Benzidine
p-Semidine 2,4-dinitro-chloro-benzene
2,5-dinitro-chloro-benzene Isosafrol
Piperonal o-Vanillin
Isovanillin o-Vanillin
Vanillin o-Phenylene diamine
p-Phenylene diamine p-Phentidine
Phenacetin Isoeugenol
Vanillin p-Methyl thiophenol
m-Methyl thiophenol Diazoaminobenzene
p-Aminoazobenzene N,N-dimethyl aniline
Aniline Methyl benzoate
Ethyl benzoate Terephthalonitrile
Isophthalonitrile p-Tolunitrile
m-Tolunitrile Methyl salicylate
Methyl p-hydroxy benzoate p-Methyl acetanilide
m-Methyl acetanilide p-Aminobenzene sulfonamide
m-Aminobenzenesulfonamide Sodium anthranilate
Sodium phthalamate Alpha-picoline
Beta-picoline 2,4-lutidine
2,6-lutidine It will be noted that some of the foregoing compounds are fairly soluble in water, and thus in the primary clathration solvent. In general this does not affect the clathration step, but may necessitate using different techniques for recovering the raffinate and extract products from aqueous solution. Conventional techniques such as solvent extraction, distillation, fractional crystallization, chemical scavenging, precipitation or the like may be utilized for this purpose, the choice of the particular method depending upon the particular compounds involved, as will be understood by those skilled in the art.

As pointed out above in the description of the drawing, there are various techniques which can be used in connection with raffinate separation step (IV) and extract separation step (VII) to recover dissolved Werner amine from product streams such as the raffinate and extract phases formed in those steps. The problem of Werner amine loss in such raffinate and extract phases is particularly acute in systems employing 4MP as the Werner amine and in which the raffinate and extract products are xylene isomers.

In one technique for reducing or substantially eliminating the loss of Werner amine in the raffinate product, a secondary solvent is added to the Werner complex solution-feed mixture, preferably after the addition of the $CO_2$, to form a solution with the non-clathrated feed material and the minor amount of Werner amine dissolved therein. Where the feed mixture is composed of aromatic hydrocarbons, such as xylene isomers, the secondary solvent can be a paraffinic or naphthenic hydrocarbon such as pentane, heptane, octane, nonane, or a mixture of hydrocarbons such as an alkylate fraction.

The solution of nonclathrated feed material, Werner amine and secondary solvent is separated from the aqueous phase of the filtrate from step (III) and sent to a secondary solvent recovery step, which may be, for example, a fractional distillation operation, wherein secondary solvent and Werner amine are distilled overhead and the nonclathrated feed material (or raffinate) is recovered as a bottoms product. The secondary solvent-Werner amine overhead product can be recirculated for reuse (as a secondary solvent) in the system, if desired.

Similarly, Werner amine can be substantially recovered from the step (VII) extract phase by the use of a secondary solvent. Thus, a secondary solvent of the above-identified type can be added to the liquid from clathrate dissolution step (VI), after which a solution of the formerly clathrated feed material (or extract), containing a minor amount of Werner amine and the secondary solvent forms as a distinct liquid phase which can be isolated and sent to a secondary solvent recovery step. Here again, as with the raffinate, the secondary solvent recovery step can be fractional distillation yielding a secondary solvent-Werner amine overhead which may, if desired, be recycled to the system, and a bottoms product consisting essentially of the formerly clathrated, or extract, portion of the feed.

A more complete recovery of the Werner amine from the raffinate and extract process streams can be accomplished by the use of an aqueous carboxylic acid, such as succinic acid, solution in conjunction with a secondary solvent of the above-noted type. When this technique is employed, the procedure with respect to the raffinate treatment is similar to that with respect to the extract treatment. Thus, in either event, the first step is to form a three component solution, in the manner previously set forth, of an appropriate secondary solvent; nonclathrated or formerly clathrated feed material, depending upon whether a raffinate or an extract fraction is involved; and Werner amine. The three component solution will hereinafter, for simplicity's sake, be discussed in terms of a typical formulation in which the secondary solvent is paraffinic hydrocarbon, the feed material is a xylene and the Werner amine is 4MP.

Typically, the three component solution is contacted with an aqueous carboxylic acid solution to produce a two phase mixture, one phase consisting essentially of xylene and paraffinic hydrocarbon and the other phase consisting essentially of the aqueous carboxylic acid solution and 4MP. The aqueous phase is distilled to produce an overhead azeotrope of 4MP and water and a bottoms of aqueous carboxylic acid substantially free of 4MP which can be recirculated to the system. The xylene-paraffinic hydrocarbon phase is distilled to remove substantially all of the xylene, as an overhead, leaving substantially pure paraffinic hydrocarbon as a bottoms product.

The aforesaid 4MP-water azeotrope can be contacted with said paraffinic hydrocarbon bottoms product, or other hydrocarbon liquid in which 4MP is soluble such as xylene feedstock, to produce a two phase liquid mixture, one phase comprising substantially pure water, which can be recycled in the system to prevent loss of water from the recirculating aqueous carboxylic acid solution, and the other phase comprising hydrocarbon liquid and 4MP which has been extracted from said azeotrope. The latter phase can be appropriately recirculated to the clathration process to return the recovered 4MP to the system.

A more detailed description of the subject Werner amine recovery method in which a carboxylic acid is employed can be found in copending U.S. patent application, Serial No. 65,641, filed October 28, 1960.

To contribute to a better understanding of this invention, the following examples are presented. It is emphasized, however, that these examples are presented merely for illustrative purposes and that the invention is not limited to the particular embodiments and conditions set forth therein.

Example I

This example illustrates the forming and precipitation of clathrates by the $CO_2$ addition method of this invention, and the effectiveness with which feedstock components are separated by means of said method.

To a 300 ml. 3-necked flask equipped with a stirrer, thermometer and gas inlet tube was added 30 g. of Ni(4-methylpyridine)$_4$(SCN)$_2$, 60 ml. of ethanolamine and 60 ml. of water. The mixture was stirred and warmed until solution was complete (approx. 40° C.). To the stirred solution was first added 23 ml. of feed xylene, then carbon dioxide was slowly passed in while maintaining the temperature near 40° C. As the $CO_2$ was introduced, a blue precipitate formed. A total of about two moles of $CO_2$ were added over a one hour period. At this point the mixture was cooled to 25° C. and stirred at this temperature for 15 minutes, then 30 ml. of isooctane were added and after two minutes of stirring the mixture was filtered. The solid on the filter was decomposed in dilute hydrochloric acid and the released hydrocarbon phase separated and analyzed.

The filtrate consisted of two liquid phases: a clear and colorless upper hydrocarbon phase and a lower pale green aqueous phase. The upper hydrocarbon phase was separated, acid washed, and analyzed. The analytical results are shown in the table below:

|  | C$_8$ Aromatic Isomer Distribution | | | | Recovery [a] | |
|---|---|---|---|---|---|---|
|  | p-Xylene | m-Xylene | o-Xylene | Et. Bz. | p-Xylene | m-Xylene |
| Feed | 14.8 | 81.2 | 0.6 | 3.3 | | |
| Clathrate crystals | 43.0 | 51.2 | 0.2 | 5.6 | 90.0 | 19.6 |
| Filtrate | 1.5 | 95.5 | 0.8 | 2.2 | 6.4 | 71.3 |

[a] Vol. percent of isomer charged recovered in that phase.

As those skilled in the art will appreciate, the above results are indicative of excellent separation of the p- and m-xylenes in the feed mixture.

Example II

This example illustrates certain aspects of our process not present in Example I.

The procedure of Example I was followed through the step of filtering the mixture after the addition of the isooctane thereto.

The filtrate was separated into its two phases and the upper hydrocarbon phase was acid washed and analyzed, all as described in Example I. The lower phase (a pale green aqueous phase as noted in Example I) is heated for 0.3 hr. at a temperature of about 115° C. to strip $CO_2$ therefrom. The heating drives off substantially all of the $CO_2$, as a result of which the ethanolamine is released from its bicarbonate form and the liquid is regenerated as a primary solvent.

The filtered solid material is mixed into the regenerated primary solvent wherein it dissolves to create two liquid phases, an upper hydrocarbon extract phase and a lower Werner complex solution phase. The hydrocarbon phase is separated and analyzed with results substantially the same as those set forth in the table in Example I.

Following are additional examples showing the operation of our process with various Werner complex solutions and feed mixtures.

Example III

A quantity of 35 percent aqueous ammonium cyanide solution containing 2.6 m. of ammonium cyanide is mixed with 5.2 m. of 2-amino-2-methyl-1-propanol. Upon admixture of the two liquids the following reaction takes place in the resulting solution:

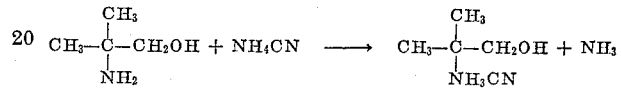

The reaction mixture, now containing water, 2-amino-2-methyl-1-propanolammonium cyanide and ammonia is refluxed to expel the ammonia. To the refluxed mixture free of ammonia there is added 0.7 m. of manganous carbonate which stoichiometrically reacts with a portion of the 2-amino-2-methyl-1-propanolammonium cyanide to yield a solution of 0.7 m. of Mn(CN)$_2$ and 1.2 m. of 2-amino-2-methyl-1-propanolammonium cyanide in a 2-amino-2-methyl-1-propanol, water and carbon dioxide solution.

To the aforesaid solution is added 2.8 m. of isoquinoline, together with sufficient water and 2-amino-2-methyl-1-propanol to yield a 35 percent solution of Mn(isoquinoline)$_4$(CN)$_2$ in a primary solvent of the following composition:

| Component: | Weight Percent |
|---|---|
| Water | 46 |
| 2-amino-2-methyl-1-propanol | 40 |
| 2-amino-2-methyl-1-propanolammonium cyanide | 14 |
| | 100 |

In calculating the above percentage figures, the presence of the $CO_2$ in the solution is disregarded.

A mixture of m-cymene and mesitylene is contacted with the above-identified Werner complex solution at a Werner complex-mesitylene weight ratio of 10. Gaseous $CO_2$ is bubbled into the resulting mixture as a result of which solid material precipitates out of solution. The solid material is filtered from the mixture. The filtrate consists of two phases, an upper hydrocarbon phase rich in m-cymene, and a lower aqueous phase. The upper hydrocarbon phase is separated from the aqueous phase as a raffinate product.

The aqueous phase of the filtrate is heated at about 115° C. to strip $CO_2$ therefrom and regenerate it as a primary solvent. The filtered solid material is mixed into the regenerated primary solvent wherein it dissolves to create two liquid phases—an upper hydrocarbon extract phase and a lower Werner complex solution phase. The hydrocarbon phase is recovered as an extract product rich in mesitylene.

Example IV

A quantity of 55 percent aqueous ammonium acetate solution containing 3 m. of ammonium acetate is mixed with 3.5 m. of 2-amino-n-butanol; upon admixture of the two liquids the following reaction takes place in the resulting solution:

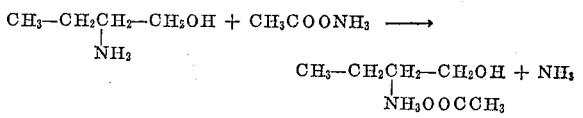

The reaction mixture, now containing water, 2-amino-1-butanolammonium acetate and ammonia is refluxed to expel the ammonia. To the refluxed mixture, free of ammonia, there is added 0.9 m. of cobaltous hydroxide which stoichiometrically reacts with a portion of the 2-amino-1-butanolammonium acetate to yield a solution of 0.9 m. of cobaltous acetate and 1.2 m. of 2-amino-1-butanolammonium acetate in a 2-amino-n-butanol and water mixture.

To the aforesaid solution is added 3.6 m. of 4-ethylpyridine together with sufficient water and 2-amino-n-butanol to yield a 20% solution of $$Co(4\text{-ethylpyridine})_4(CH_4CO_2)_2$$

in a primary solvent of the following composition:

| Component: | Weight Percent |
|---|---|
| Water | 50.0 |
| 2-amino-n-butanol | 38.8 |
| 2-amino-1-butanolammonium acetate | 11.2 |
| | 100.0 |

A mixture of m-ethyl toluene and p-ethyl toluene is contacted with the above-identified Werner complex solution at a Werner complex/p-ethyl toluene weight ratio of 9.5. Gaseous $CO_2$ is bubbled into the resulting mixture as a result of which solid material precipitates out of solution. The solid material is filtered from the mixture. The filtrate consists of two phases, an upper hydrocarbon phase rich in m-ethyl toluene and a lower aqueous phase. The upper hydrocarbon phase is separated from the aqueous phase as a raffinate product.

The aqueous phase of the filtrate is heated at about 115° C. to strip $CO_2$ therefrom and regenerate it as a primary solvent. The filtered solid material is mixed into the regenerated primary solvent wherein it dissolves to create two liquid phases, an upper hydrocarbon extract phase and a lower Werner complex solution phase. The hydrocarbon phase is recovered as an extract product rich in p-ethyl toluene.

Example V

A quantity of 45% aqueous ammonium cyanate solution containing 2.6 m. of ammonium cyanate is mixed with 4 m. of 2-(methylamino) ethanol. Upon admixture of the two liquids the following reaction takes place in the resulting solution:

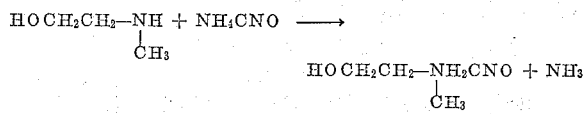

The reaction mixture, now containing water, 2-(methylamino) ethanolammonium cyanate and ammonia is refluxed to expel the ammonia. To the refluxed mixture free of ammonia there is added 1 m. of ferrous carbonate which stoichiometrically reacts with a portion of the 2-(methylamino) ethananolammonium cyanate to yield a solution of 1 m. of ferrous cyanate and 0.6 m. of 2-(methylamino) ethanolammonium cyanate in a 2-(methylamino) ethanol, water and carbon dioxide solution.

To the aforesaid solution is added 4 m. of pyridine together with sufficient water and 2-(methylamino) ethanol to yield a 20 percent solution of $Fe(pyridine)_4(CNO)_2$ in a primary solvent of the following composition.

| Component: | Weight Percent |
|---|---|
| Water | 76.6 |
| 2-(methylamino) ethanol | 20.0 |
| 2-(methylamino) ethanolammonium cyanate | 3.4 |
| | 100.0 |

In calculating the above percentage figures, the presence of the $CO_2$ in the solution is disregarded.

A mixture of biphenyl and diphenyl methane is contacted with the above-identified Werner complex solution at a Werner complex/biphenyl weight ratio of 10. Gaseous $CO_2$ is bubbled into the resulting mixture as a result of which solid material precipitates out of solution. The solid material is filtered from the mixture. The filtrate consists of two phases, an upper hydrocarbon phase rich in diphenyl methane and a lower aqueous phase. The upper hydrocarbon phase is separated from the aqueous phase as a raffinate product.

The aqueous phase of the filtrate is heated at about 110° C to strip $CO_2$ therefrom and regenerate it as a primary solvent. The filtered solid material is mixed into the regenerated primary solvent wherein it dissolves to create two liquid phases, an upper hydrocarbon extract phase and a lower Werner complex solution phase. The hydrocarbon phase is recovered as an extract product rich in biphenyl.

Example VI

A quantity of 50 percent aqueous ammonium thiocyanate solution containing 2.6 m. of ammonium thiocyanate is mixed with 2.6 m. of ammonium hydroxide in a 50 percent solution. No reaction takes place upon mixture of the two liquids, and the resulting solution is a mixture of 2.6 m. of ammonium thiocyanate and 2.6 m. of ammonium hydroxide in an aqueous solution.

To the mixture there is added 0.5 m. of platinous hydroxide which stoichiometrcally reacts with a portion of the ammonium thiocyanate to yield a solution of 0.5 m. of platinous thiocyanate and 0.6 m. of ammonium thiocyanate in an ammonium hydroxide solution.

To the aforesaid solution is added two m. of 4-methoxy-3-ethylpyridine, together with sufficient aqueous ammonium hydroxide solution to yield a 30 percent solution of $Pt(4\text{-methoxy, }3\text{-ethylpyridine})_4(SCN)_2$ in a primary solvent of the following composition.

| Component: | Weight percent |
|---|---|
| Water | 55.6 |
| Ammonium hydroxide | 30.0 |
| Ammonium thiocyanate | 14.4 |
| | 100.0 |

A mixture of tetralin and naphthalene is contacted with the above-identified Werner complex solution at a Werner complex/naphthalene weight ratio of 10. Gaseous $CO_2$ is bubbled into the resulting mixture, as a result of which solid material precipitates out of solution. The solid material is filtered from the mixture. The filtrate consists of two phases, an upper hydrocarbon phase rich in tetralin and a lower aqueous phase. The upper hydrocarbon phase is separated from the aqueous phase as a raffinate product.

The aqueous phase of the filtrate is heated to strip $CO_2$ therefrom and regenerate it as a primary solvent. The filtered solid material is mixed into the regenerated primary solvent wherein it dissolves to create two liquid phases, an upper hydrocarbon extract phase and a lower Werner complex solution phase. The hydrocarbon phase is recovered as an extract product rich in naphthalene.

Example VII

A quantity of 50 percent aqueous ammonium chloride solution containing 2.6 m. of ammonium chloride is mixed with 4.5 m. of diethanolamine. Upon admixture of the two liquids the following reaction takes place in the resulting solution:

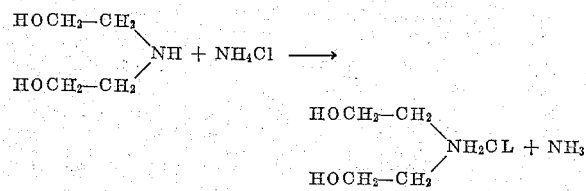

The reaction mixture, now containing water, diethanolamine, diethanolammonium chloride and ammonia is refluxed to expel the ammonia. To the refluxed mixture free of ammonia there is added 0.6 m. of nickelous carbonate which stoichiometrically reacts with a portion of the diethanolammonium chloride to yield a solution of 0.6 m. of nickelous chloride and 1.4 m. of diethanolammonium chloride in a diethanolamine, water and $CO_2$ solution.

To the aforesaid solution is added 2.4 m. of 4-chloro-3-methylpyridine, together with sufficient water and diethanolamine to yield a 25 percent solution of Ni(4-chloro, 3-methyl-pyridine)$_4$(Cl$_2$)$_2$ in a primary solvent of the following composition.

| Component: | Weight percent |
|---|---|
| Water | 57.2 |
| Diethanolamine | 30.0 |
| Diethanolammonium chloride | 12.8 |
| | 100.0 |

In calculating the above percentage figures, the presence of the $CO_2$ in the solution is disregarded.

A mixture of durene and isodurene is contacted with the above-identified Werner complex solution at a Werner complex/durene weight ratio of 10. Gaseous $CO_2$ is bubbled into the resulting mixture as a result of which solid material precipitates out of solution. The solid material is filtered from the mixture. The filtrate consists of two phases, an upper hydrocarbon phase rich in isodurene and a lower aqueous phase. The upper hydrocarbon phase is separated from the aqueous phase as a raffinate product.

The aqueous phase of the filtrate is heated at about 110° C. to strip $CO_2$ therefrom and regenerate it as a primary solvent. The filtered solid material is mixed into the regenerated primary solvent wherein it dissolves to create two liquid phases, an upper hydrocarbon extract phase and a lower Werner complex solution phase. The hydrocarbon phase is recovered as an extract product rich in durene.

It will be apparent to those skilled in the art that our process can be carried out with a great number and variety of Werner complex solutions for purposes of separating many types of difficultly separable compounds from their common mixtures by merely performing the method taught herein using different combinations of the various Werner complex and primary solvent ingredients and feed materials within the scope of the invention.

We claim:

1. In a selective clathration process for the separation of organic compounds, wherein the feed mixture to be resolved is contacted with a solution of a Werner complex dissolved in a primary solvent comprising an aqueous solution of a nitrogen base of sufficient strength to form a bicarbonate upon contact with carbon dioxide in the presence of water, and clathration is effected by altering the primary solvent environment to effect precipitation of solid Werner complex clathrate, the improved method of so altering said environment comprising the addition of carbon dioxide to said mixture.

2. A method for resolving a feed mixture of organic compounds differing in molecular configuration comprising: (1) forming a solution of a Werner complex in a primary solvent comprising an aqueous solution of a nitrogen base of sufficient strength to form a bicarbonate upon contact with carbon dioxide in the presence of water; (2) effecting intimate contact of said solution with said feed mixture; and (3) bringing the Werner complex constituents in solution into contact with carbon dioxide to effect precipitation of a solid clathrate of at least one component of said feed mixture with said Werner complex.

3. The method of claim 2 in which steps (2) and (3) are carried out simultaneously.

4. A method for resolving a feed mixture of organic compounds differing in molecular configuration and wherein at least one component is substantially aromatic, comprising: (1) forming a solution of a Werner complex comprising a salt of a metal of atomic number above 12 coordinated with a Werner amine in a primary solvent comprising an aqueous solution of a nitrogen base of sufficient strength to form a bicarbonate upon contact with carbon dioxide in the presence of water; (2) mixing the resulting solution with said feed mixture; (3) introducing carbon dioxide into the resulting mixture to effect precipitation of solid clathrate of at least one substantially aromatic component of said feed mixture with said Werner complex; (4) separating said solid clathrate from the resulting mixture leaving behind a two phase liquid residuum comprising primary solvent with carbon dioxide in solubilized form therein and non-clathrated feed mixture material; (5) separating said liquid residuum into its two phases; (6) treating the primary solvent phase from said residuum in such fashion as to expel substantially all of the carbon dioxide therefrom; and (7) dissolving solid clathrate from step (5) in the substantially carbon dioxide free primary solvent from step (6) to free the clathrated feed mixture material therefrom, which forms as one phase, and regenerated Werner complex solution, which forms as a second phase.

5. The method of claim 4 wherein the step (6) treatment for removal of the carbon dioxide from the primary solvent phase from step (5) comprises heat treatment.

6. A method for resolving a mixture of disubstituted benzene isomers including a para isomer, comprising: (1) forming a solution of a Werner complex consisting of a salt selected from the group consisting of the thiocyanates, isothiocynates, cyanates, isocyanates, cyanides and azides of metals selected from the group consisting of manganese, iron, cobalt and nickel, coordinated with a heterocyclic nitrogen base, in a primary solvent comprising an aqueous solution of a nitrogen base of sufficient strength to form a bicarbonate upon contact with carbon dioxide in the presence of water; (2) mixing the resulting Werner complex solution with the mixture of disubstituted benzene isomers; (3) introducing carbon dioxide into the resulting mixture to effect precipitation of a solid clathrate of said para isomer from said mixture of disubstituted benzene isomers, with said Werner complex; (4) separating said solid clathrate from the resulting mixture leaving behind a two phase liquid residuum comprising primary solvent with carbon dioxide in solubilized form therein and raffinate material from said mixture of disubstituted benzene isomers; (5) substantially separating said liquid residuum into its two phases; (6) heating the primary solvent phase from said residuum to expel substantially all of the carbon dioxide therefrom; (7) dissolving solid clathrate from step (4) in the substantially carbon dioxide free primary solvent from step (6) to free said para isomer therefrom, which forms as an extract phase, and regenerated Werner complex solution, which forms as a separate phase; and (8) separating said extract phase from the regnerated Werner complex solution phase.

7. The method of claim 6 in which the Werner complex is nickel tetra(4-methylpyridine)dithiocyanate.

8. The method of claim 6 in which the primary solvent is an aqueous alkanolamine solution.

9. The method of claim 6 in which the primary solvent is an aqueous solution of ammonia.

10. The method of claim 6 in which the primary solvent is said aqueous nitrogen base solution having dissolved therein a minor proportion of a water-soluble ammonium salt.

11. The method of claim 6 in which the primary solvent is an aqueous alkanolamine solution having dissolved therein a minor proportion of an alkanolammonium thiocyanate.

12. A method for resolving a feed mixture of disubstituted benzene isomers including a para isomer, comprising: (1) forming a solution of a Werner complex consisting of a salt selected from the group consisting of the thiocyanates, isothiocyanates, cyanates, isocyanates, cyandies and azides of metals selected from th group consisting of manganese, iron, cobalt and nickel coordinated with a heterocyclic nitrogen base, in a primary solvent comprising an aqueous solution of a nitrogen base of sufficient strength to form a bicarbonate upon contact with carbon dioxide in the presence of water; (2) mixing resulting Werner complex solution with the mixture of disubstituted benzene isomers; (3) introducing carbon dioxide into the resulting mixture to effect precipitation of a solid clathrate of said para isomer from said mixture of disubstituted benzene isomers, with said Werner complex; (4) adding to the resulting mixture a secondary solvent to form a solution with nonclathrated material from said feed mixture; (5) separating said solid clathrate from the resulting mixture to leave two liquid phases, one comprising a solution of said nonclathrated portion of said feed mixture, a minor amount of said heterocyclic nitrogen base and the secondary solvent and the other comprising said primary solvent containing carbon dioxide in solubilized form; (6) separating said two liquid phases; (7) treating the liquid phase containing said secondary solvent to recover therefrom a fraction comprising said secondary solvent and said heterocyclic nitrogen base, and a raffinate fraction; (8) heating the primary solvent phase containing said carbon dioxide in solubilized form to expel carbon dioxide therefrom; (9) redissolving said solid clathrate in the substantially carbon dioxide free primary solvent from step (8); (10) adding to the resulting mixture a secondary solvent to form a solution with the clathrated portion of the feed mixture released in step (9); (11) separating the resulting mixture into a Werner complex solution phase and an extract hydrocarbon phase; and (12) treating said extract hydrocarbon phase to recover therefrom a fraction comprising said secondary solvent and a minor amount of said heterocyclic nitrogen base and an extract hydrocarbon fraction enriched in said para isomer.

13. The method of claim 12 in which the secondary solvent added in step (4) is a saturated hydrocarbon and the secondary solvent added in step (10) is a saturated hydrocarbon.

14. The method of claim 12 in which the fraction comprising said secondary solvent and said heterocyclic nitrogen base recovered in step (7) is recycled to step (4) and the fraction comprising said secondary solvent and said heterocyclic nitrogen base recovered in step (12) is recycled to step (10).

15. A method for resolving a xylene feed mixture including p-xylene, which comprises: (1) forming a Werner complex solution of from about 15 to about 40 percent by weight nickel tetra(4-methylpyridine)dithiocyanate in a primary solvent comprising from about 30 to about 60 percent by weight water, from about 30 to about 50 percent by weight ethanolamine and from about 10 to about 30 percent by weight ethanolammonium thiocyanate; (2) admixing the Werner complex solution from step (1) with said xylene mixture; (3) introducing carbon dioxide into the resulting mixture to effect precipitation of a solid clathrate of p-xylene and nickel tetra(4-methylpyridine)-dithiocyanate; (4) adding to the resulting mixture a saturated hydrocarbon to form a solution with nonclathrated xylene material from said feed mixture; (5) separating said solid clathrate from the resulting mixture to leave a two phase liquid residuum behind, one phase comprising a solution of said nonclathrated xylene material, a minor amount of 4-methylpyridine and said saturated hydrocarbon, and the other phase comprising said primary solvent containing carbon dioxide in solubilized form; (6) separating said liquid residuum into its two phases; (7) treating the liquid phase containing said saturated hydrocarbon to recover therefrom a solution of said saturated hydrocarbon and 4-methylpyridine and a nonclathrated xylene fraction; (8) heat treating the primary solvent phase from step (6) at a temperature of from about 90° to about 120° C. to expel substantially all of the carbon dioxide therefrom; (9) redissolving the solid clathrate phase from step (5) in the heat-treated primary solvent from step (8); (10) adding to the resulting mixture a saturated hydrocarbon; (11) separating the resulting mixture into a reconstituted Werner complex solution phase and an extract hydrocarbon phase; and (12) treating said extract hydrocarbon phase to recover therefrom said saturated hydrocarbon and 4-methylpyridine and an extract hydrocarbon fraction enriched in p-xylene.

16. The method of claim 15 in which the Werner complex solution formed in step (1) consists of about 25 percent by weight nickel tetra(4-methylpyridine)dithiocyanate in a primary solvent comprising about 45 percent by weight water, about 38 percent by weight ethanolamine and about 17 percent by weight ethanolammonium thiocyanate.

17. The method of claim 15 in which the saturated hydrocarbon and 4-methylpyridine recovered in step (7) and the saturated hydrocarbon and 4-methylpyridine recovered in step (12) are recycled to appropriate steps of the described process.

18. The method of claim 15 in which step (7) is accomplished by (a) contacting said liquid phase containing said saturated hydrocarbon with an aqueous carboxylic acid solution to produce a two phase mixture; (b) separating said two phase mixture into a substantially acid free phase of xylene raffinate material and saturated hydrocarbon and an aqueous phase containing said carboxylic acid and 4-methylpyridine; (c) distilling said aqueous phase to produce an overhead azeotrope of 4-methylpyridine and water and a bottoms of aqueous carboxylic acid substantially free of 4-methylpyridine; (d) distilling said substantially acid free phase of xylene raffinate material and saturated hydrocarbon to obtain an overhead xylene raffinate product and a bottoms product of said saturated hydrocarbon; (e) contacting the overhead azeotrope from step (c) with a hydrocarbon material to produce a two phase mixture; and (f) separating said mixture into an aqueous phase and a hydrocarbon phase containing 4-methylpyridine; and step (12) is accomplished by (g) contacting said extract hydrocarbon phase with an aqueous carboxylic acid solution to produce a two phase mixture; (h) separating said two phase mixture into a substantially acid free phase of p-xylene enriched extract and saturated hydrocarbon and an aqueous phase containing said carboxylic acid and 4-methylpyridine; (i) distilling said aqueous phase to produce an overhead azeotrope of 4-methylpyridine and water and a bottoms of aqueous carboxylic acid substantially free of 4-methylpyridine; (j) distilling said substantially acid free phase of p-xylene enriched extract and saturated hydrocarbon to obtain an overhead p-xylene enriched extract product and a bottoms product of said saturated hydrocarbon; (k) contacting the overhead azeotrope from step (i) with a hydrocarbon material to produce a two phase mixture; and (l) separating said mixture into an aqueous phase and a hydrocarbon phase containing 4-methylpyridine.

19. The method of claim 18 in which the xylene feed mixture comprises p-xylene and m-xylene isomers.

20. The method of claim 15 in which the saturated hydrocarbon added in step (4) and that added in step (10) is, in each case, isooctane.

References Cited in the file of this patent

UNITED STATES PATENTS

| | | |
|---|---|---|
| 2,798,103 | Schaeffer et al. | July 2, 1957 |
| 2,798,891 | Schaeffer | July 9, 1957 |
| 3,029,300 | Schaeffer | Apr. 10, 1962 |

UNITED STATES PATENT OFFICE
CERTIFICATE OF CORRECTION

Patent No. 3,162,693            December 22, 1964

William D. Schaeffer et al.

It is hereby certified that error appears in the above numbered patent requiring correction and that the said Letters Patent should read as corrected below.

Column 20, line 19, for "step (5)" read -- step (4) --; column 21, line 2, for "cyandies" read -- cyanides --; same line 2, for "th" read -- the --; same column 21, line 8, after "mixing" insert -- the --.

Signed and sealed this 18th day of May 1965.

(SEAL)
Attest:

ERNEST W. SWIDER            EDWARD J. BRENNER
Attesting Officer            Commissioner of Patents